United States Patent [19]

Proctor et al.

[11] Patent Number: 5,720,998
[45] Date of Patent: Feb. 24, 1998

[54] MULTI-LAYERED PIZZA PRODUCT, AND METHOD OF MAKING

[75] Inventors: Valerie A. Proctor, Frisco, Tex.; Karen Heidebrecht, Wichita, Kans.

[73] Assignee: Pizza Hut, Inc., Wichita, Kans.

[21] Appl. No.: 587,912

[22] Filed: Jan. 16, 1996

Related U.S. Application Data

[60] Provisional application No. 60/007,346 Nov. 20, 1995.

[51] Int. Cl.$^6$ ............................................. A21D 13/00
[52] U.S. Cl. ........................ 426/94; 426/89; 426/274; 426/275; 426/283; 426/302
[58] Field of Search ...................... 429/89, 94, 274, 429/275, 283, 289, 302; 426/523

[56] References Cited

U.S. PATENT DOCUMENTS

| | | | |
|---|---|---|---|
| 3,615,678 | 10/1971 | Tangel | 426/94 |
| 3,753,733 | 8/1973 | Bell | 426/275 |
| 4,159,349 | 6/1979 | Cajello | 426/94 |
| 4,283,431 | 8/1981 | Giordano et al. | 426/94 |
| 4,551,337 | 11/1985 | Schmit et al. | 426/94 |
| 4,574,090 | 3/1986 | Paulucci | 426/94 |
| 5,202,138 | 4/1993 | Stypula | 426/94 |
| 5,405,627 | 4/1995 | Ito | 426/94 |

OTHER PUBLICATIONS

Bruno, Pasquale, Jr., *The Great Chicago Style Pizza Cookbook*, 1983, pp. 82–83.
McNair, James, *Pizza*, 1987, p. 44.

*Primary Examiner*—Lien Tran
*Attorney, Agent, or Firm*—Patterson & Keough, P.A.

[57] ABSTRACT

A multi-layered pizza product includes multiple dough layers and multiple ingredient layers. A cheese or other ingredient layer is disposed between a first, bottom dough layer and a second dough layer disposed in a middle portion of the pizza. The cheese layer preferably includes a blend of different cheeses and has a relatively reduced moisture content in a desired range to reduce the amount of steam produced during baking. The second dough layer preferably includes at least one vent opening to vent steam that is produced by the cheese during baking. The second dough layer supports an additional ingredient layer that includes tomato sauce, cheese, and/or other traditional pizza topping ingredients. A method of producing a baked pizza product requires only a single, continuous baking step, greatly reducing the lengthy preparation time typically required for multi-layered pizza products.

20 Claims, 3 Drawing Sheets

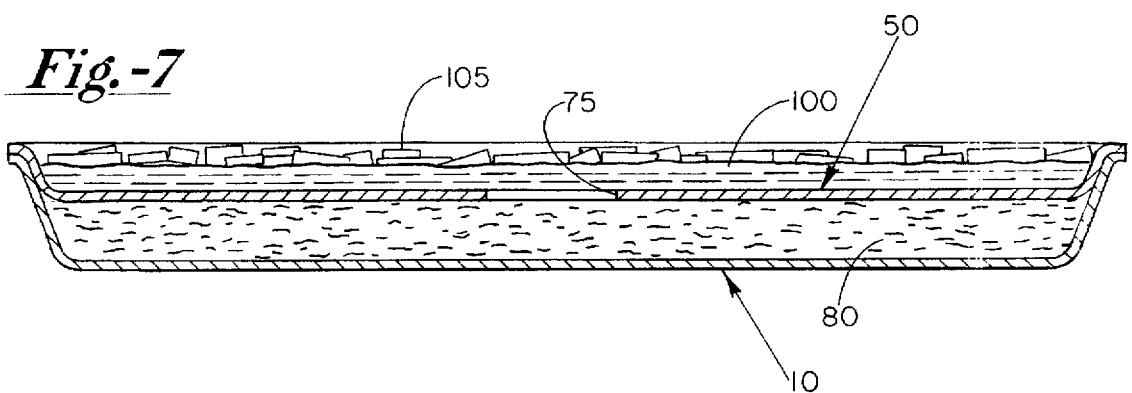
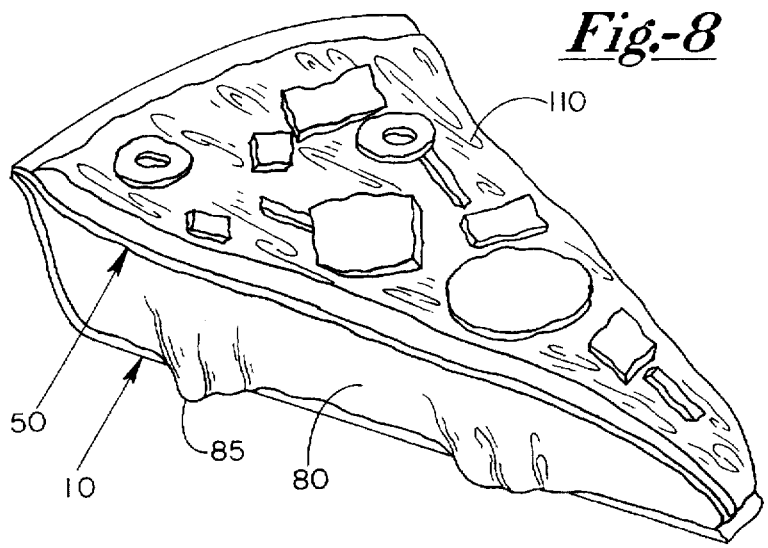
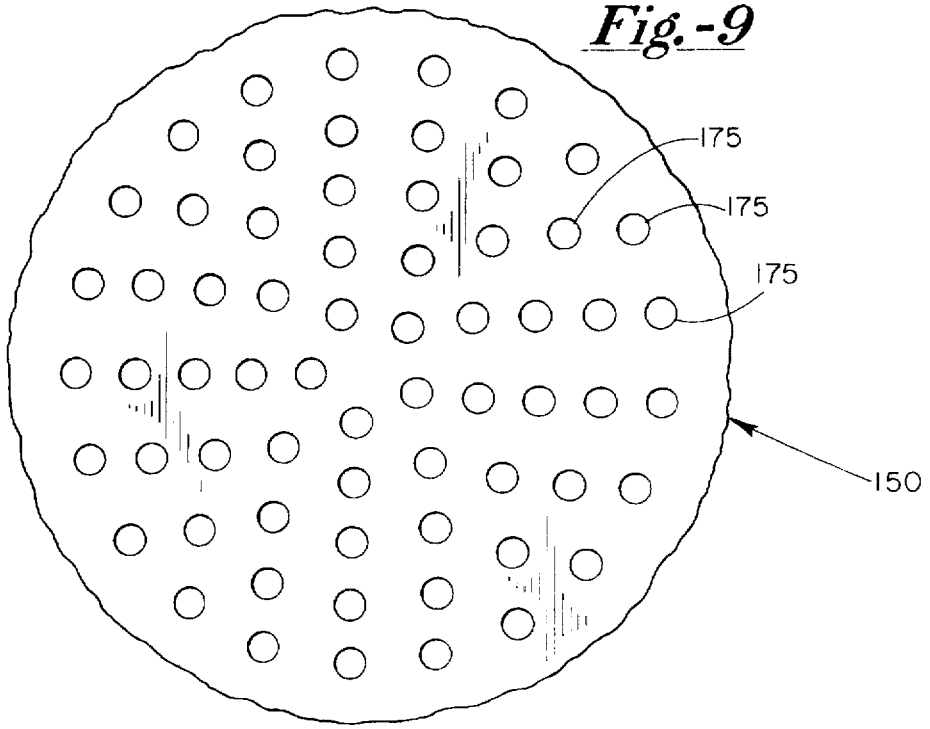

MULTI-LAYERED PIZZA PRODUCT, AND METHOD OF MAKING

CROSS-REFERENCE TO RELATED APPLICATION

This application is based on U.S. Provisional application Ser. No. 60/007346 to Proctor et al., entitled "Multi-Layered Pizza Product, and Method of Making, filed Nov. 20, 1995, which is incorporated by reference in its entirety herein.

BACKGROUND OF THE INVENTION

1. Field of the Invention

The present invention relates to a pizza-type product and its method of preparation. More particularly, the present invention relates to a pizza having two crust layers with at least one interposed ingredient layer, and methods of forming and baking such a pizza.

2. Description of Related Art

Pizza is an enormously popular food item, both in the United States and abroad. Different types and different varieties of pizza abound: grocery stores, dine-in and carry-out restaurants, and other such establishments collectively sell billions of dollars worth of pizza products every year. Many of the pizzas that people typically consider to be the most flavorable and desirable are made from scratch at home, or are available only through specialty restaurants. In both cases, preparing such pizzas requires a significant amount of time, and consumers of these pizzas typically are willing, or at least expect, to endure a long wait before partaking.

An example of one such pizza product is described in U.S. Pat. No. 4,283,431 to Giordano et al., which is incorporated herein by reference. Giordano et al. discloses a method of making a multi-layer pizza product having multiple crusts, with ingredients disposed between the crusts. The disclosed method, however, requires no less than three baking steps. First, a pastry layer is pre-baked. A layer of ingredients, including tomato sauce, is applied to the pre-baked pastry layer, and then a blend of mozzarella and provolone cheese is distributed over the ingredients layer. A second layer of unbaked pastry is stretched over the cheese layer, and the partially made pizza is then partially baked, in a second baking step. Once the second baking step is completed, the previous layers are allowed to cool, and an additional layer of ingredients is applied to the upper surface of the second pastry layer. Finally, as the third baking step, the entire assembly is then baked until done.

The Giordano et al. method would be extremely disadvantageous for use in pizza restaurants where customers expect their pizzas to be made to order in a reasonably brief period of time. The three separate baking steps required, as well as the cooling step, require too much time to be practical for use in such restaurants. Similarly, the Giordano et al. pizza is best-suited for baking in a deck oven, instead of the conveyor ovens typical in high-volume pizza restaurants.

A pizza product and process with similar problems is shown in McNair, J., "Pizza," Rockpile Press, 1987, p. 44. McNair shows a "Chicago-style stuffed deep dish" pizza in which a dough portion is rolled into a circle and fit into the bottom and sides of a deep-dish pan. The dough shell in the pan receives a spinach-mozzarella mixture. A second dough circle then is placed on top of the spinach-mozzarella mixture, and the two dough portions are pressed together to seal.

Two separate baking steps follow. In the first step, the partially formed pizza is baked first on an oven bottom rack and then on an oven top rack, for a total of twenty minutes. The partially formed pizza product is then removed from the oven, and tomatoes and cheese placed on top of the second dough portion. The now-completed pizza product is returned to the oven and baked for an additional ten to fifteen minutes until the crust is a golden brown.

Like Giordano et al., McNair's pizza requires multiple assembly and multiple baking steps, and thus is time- and labor-intensive. McNair's pizza requires too much time to be practical for use in restaurants where customers expect to wait only a reasonably brief period of time, for example. Additionally, McNair's pizza is best-suited for baking in a deck oven, instead of the conveyor ovens typical in high-volume pizza restaurants.

Therefore, it would be desirable to produce a specialty pizza, such as a pizza having multiple crust and ingredient layers, that can be completely baked, start-to-finish, in a short period of time.

SUMMARY OF THE INVENTION

To overcome the problems and disadvantages described above, a method of preparing a pizza product according to an embodiment of the invention includes placing a first dough layer onto a pizza-baking utensil, placing a cheese or other ingredient layer over the first dough layer to substantially cover the first dough layer, placing a second dough layer over the cheese layer, the second dough layer being formed to define a vent opening therethrough, placing an additional pizza topping ingredient, such as tomato sauce and/or cheese, for example, onto the second dough layer, and baking the thus-formed pizza product in a single, continuous baking step. According to a preferred embodiment, steam that originates in the cheese layer disposed between the first and second dough layers vents through the vent opening in the second dough layer, preventing undesirable bubbling and other distortion in the second dough layer and redistribution of the ingredients placed onto the second dough layer.

According to one embodiment, the vent opening defined in the second dough layer is punched through the dough layer before it is placed over the first dough layer in the pan. A handheld or other type hole-punching device, a dough press, or a similar instrument can be used to create the vent opening. Additionally, to facilitate mass production of pizza products according to the invention, the vent opening can be created in multiple second dough layers in one continuous step. Each second dough layer, with its respective vent opening, can be used in a different pizza product to be prepared according to the invention.

According to another aspect of the invention, a pizza product includes a first, bottom dough layer defining multiple perforations extending at least partially therethrough, and a first ingredient layer supported by and at least partially covering the first dough layer, the first ingredient layer including cheese, for example. A second dough layer is supported by and at least partially covers the first ingredient layer, the second dough layer defining a vent hole disposed preferably entirely therethrough and defining multiple perforations extending at least partially therethrough. A second ingredient layer is supported by and at least partially covers the second dough layer.

According to one embodiment, the cheese and/or other ingredients of the first ingredient layer includes a blend of different cheeses, such as mozzarella, cheddar, monterey jack, provolone, parmesan and romano cheeses. Also according to a preferred embodiment, the first ingredient layer is sealed within the two crusts and is within a preferred moisture range, to reduce the amount of steam generated between the first and second dough layers.

Other aspects and features of the invention are described in the Detailed Description portion of this application, below.

BRIEF DESCRIPTION OF THE DRAWINGS

Preferred embodiments according to the invention will be described with reference to the Figures, in which like reference numerals denote like elements and in which:

FIGS. 7 is a cross-sectional view of an assembled pizza product according to one embodiment of the invention;

FIGS. 8 is a perspective view showing a slice of cooked pizza product according to one embodiment of the invention; and FIGS. 9 is a top view of a top dough sheet according to an embodiment of the invention.

DETAILED DESCRIPTION OF PREFERRED EMBODIMENTS

As described earlier, embodiments according to the invention provide a multi-layer pizza product that is relatively straightforward to prepare. The product can be baked in a single, continuous step, without complicated or cumbersome partial preparation steps. Instead of requiring pre-baking and/or partial baking steps, and instead of requiring multiple passes through a baking oven, methods and products according to the invention allow raw ingredients to be assembled into a multiple-crust product, with an interposed cheese and/or other ingredient layer, and allow the product to be completely baked in a baking oven in a single, continuous step. For example, a pizza according to the invention can be completely baked on a single pass though a conveyor-type oven, which generally is set for a single conveying speed (and thus baking time) and a single baking temperature.

A preferred pizza product according to the invention includes at least two dough layers, with a cheese and/or other ingredient layer interposed between them. As will be described, a bottom dough layer is placed into a pizza-baking utensil, such as a pizza pan. A cheese layer is then placed over the bottom dough layer. A top dough layer is then placed over the cheese/ingredient layer and sealed to the edges of the bottom dough layer. The top dough layer preferably includes at least one steam vent aperture, to allow steam emanating from the cheese during the baking process to escape. On top of the upper dough layer, and before baking commences, other ingredients are placed, such as tomato sauce, cheese and other traditional pizza toppings such as pepperoni, sausage, mushrooms, etc.

According to a preferred embodiment, cheese disposed between the top and bottom dough layers has a relatively reduced moisture content within a preferred moisture range, to reduce the amount of steam produced and thus reduce the bubbling/blistering that would otherwise occur in the top dough layer and the ingredients disposed on the top dough layer. The thus-prepared pizza product can be baked in a single-continuous baking step, without cooling, partial-baking or other time-consuming steps. Therefore, a pizza product according to the invention can be ordered, assembled, baked, and delivered to the customer in an extraordinarily short period of time.

Figure 1:
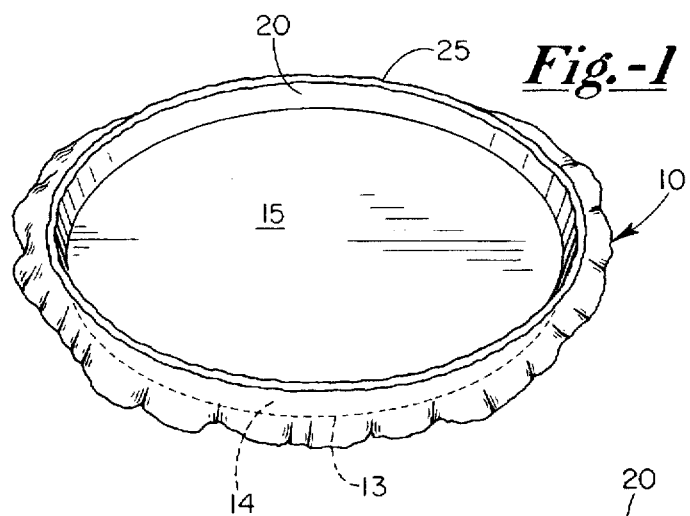
FIGS. 1 is a perspective view of a panned, bottom dough sheet according to one embodiment of the invention.

A preferred pizza product and its method of making according to the invention will be described with respect to the Figures. As shown in FIGS. 1, bottom dough layer 10 is placed onto a pizza-baking utensil 13, such as a deep-dish pizza pan with a raised, angled rim 14. According to one embodiment, pan 13 is twelve inches in diameter and is relatively thin, and is preferably sprayed with food release or otherwise treated to prevent the pizza product from sticking to the pan. Of course, other diameters and pan thicknesses are also contemplated.

Dough sheet 10 is preferably smoothed to edges of pan 13 with the palm of the preparer's hand. Dough sheet 10 thus forms a bottom 15, side portions 20, and overhanging edges 25 while in pan 13. At this point in the preparation process, overhanging edges 25 preferably are not trimmed. Also according to a preferred embodiment, no tomato sauce is applied to bottom dough sheet 10 at this point.

The dough layers used to form the two crusts of the product are preferably, although not necessarily, identical in thickness and shape, and preferably are heavily docked, as will be described. According to a preferred embodiment, 10-ounce dough sheets are used on a 12-13 inch pizza, resulting in a crust thickness of no more than 0.125 inches. Because the crust layers should be strong enough to hold the various layers of ingredients, a low-moisture dough is used to give a cracker-type crust. A relatively thin pan is used to enhance the crispness of the dough, which also enhances strength.

Figure 2:
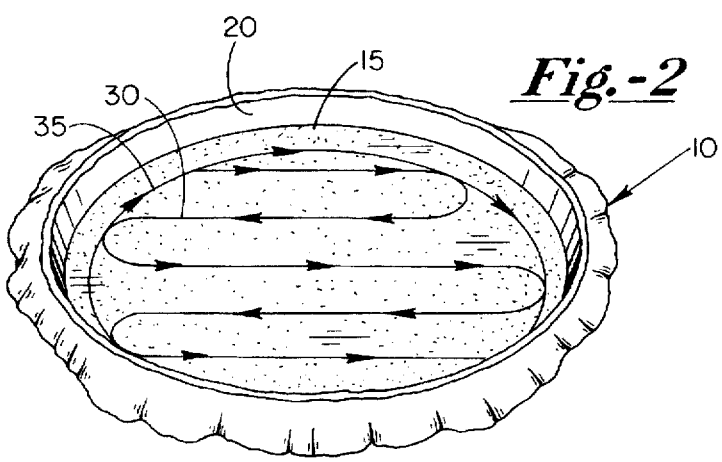
FIGS. 2 is a perspective view showing a perforation application pattern for the FIGS. 1 dough sheet.

As shown in e.g. FIGS. 2, dough sheet 10 can be heavily docked, that is, perforated at least partially through the thickness of the dough sheet, after being placed in pan 13. According to one embodiment, at least eight passes are made over dough sheet 10 with a perforating roller or similar device. FIGS. 2, for example, shows four side-to-side passes 30, as viewed in that Figure, which preferably are to be followed by at least four top-bottom passes (not shown). Additionally, at least one circumferential pass 35 can also occur. Of course, dough sheet 10 can also be perforated before being placed in pan 13, as is further described below.

Figure 3:
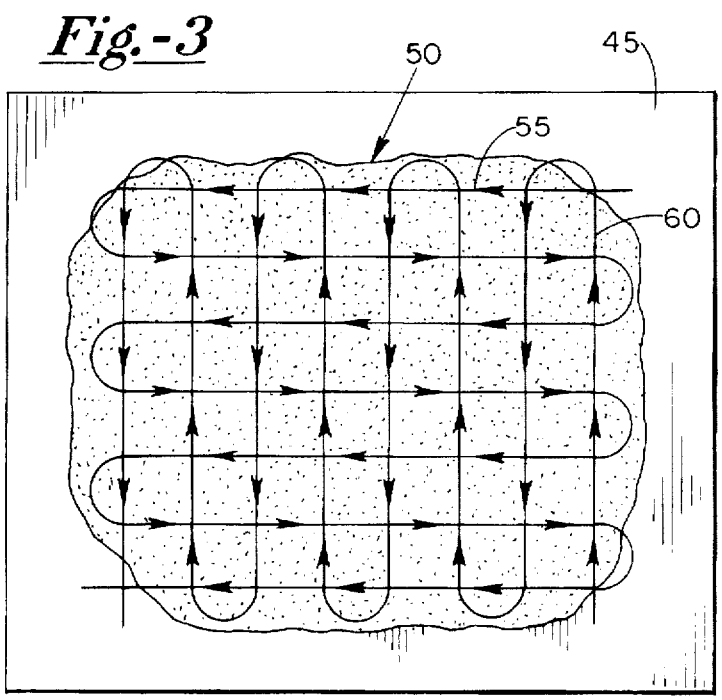
FIGS. 3 is a plan view showing a perforation application pattern for a top dough sheet, according to one embodiment of the invention.

As shown in FIGS. 3, upper dough sheet 50 is then laid out on a cutting board 45 or similar flat utensil. Multiple side-to-side passes 55 and top-bottom passes 60 (as viewed in FIGS. 3) are made with a perforating roller or similar device, to heavily perforate the upper dough sheet 50.

According to another, simpler embodiment, bottom dough sheet 10 can be perforated before being placed into pan 13, as is the case with upper dough sheet 50. Dough sheet 10 is preferably laid out on a cutting board 45 and docked in the manner illustrated in FIGS. 3, or some other suitable manner. This practice has the advantage of greater operational simplicity.

Perforating both bottom dough layer 10 and upper dough layer 50 is highly desirable. If both dough sheets are not perforated properly, air bubbles can form and cause layer separation within the individual dough sheets.

During the baking process, steam is generated within the first ingredient layer placed on lower dough sheet 10. Without adequate venting through upper dough sheet 50, the generated steam can cause upper dough sheet 50 to rise up or "dome" in a highly undesirable fashion. This rising effect can cause food ingredients placed on top of upper dough sheet 50 to slide off the pizza product, or at least be redistributed on dough sheet 50, in a manner that is at best unattractive and unappetizing. This problem is eliminated, however, by creating a steam vent opening in upper dough sheet 50, as will now be described.

Figure 4:
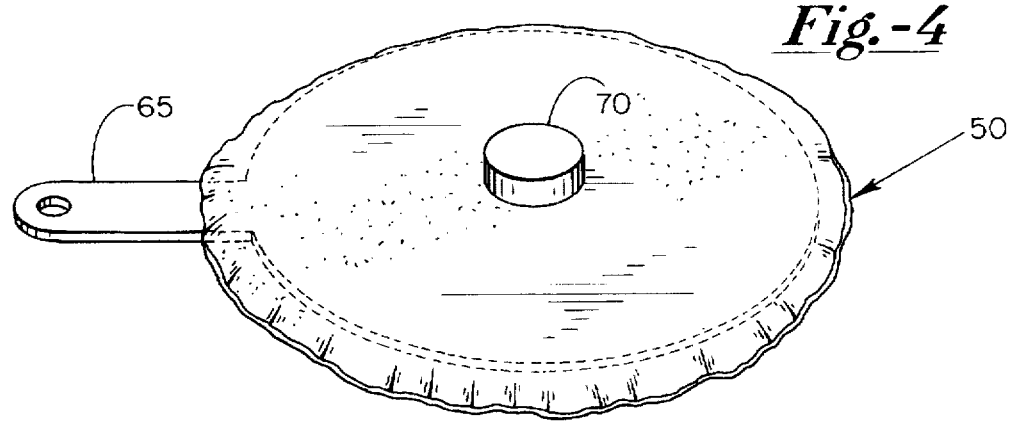
FIGS. 4 is a perspective view showing creation of a steam vent opening in the top dough sheet, according to one embodiment of the invention.
Figure 6:
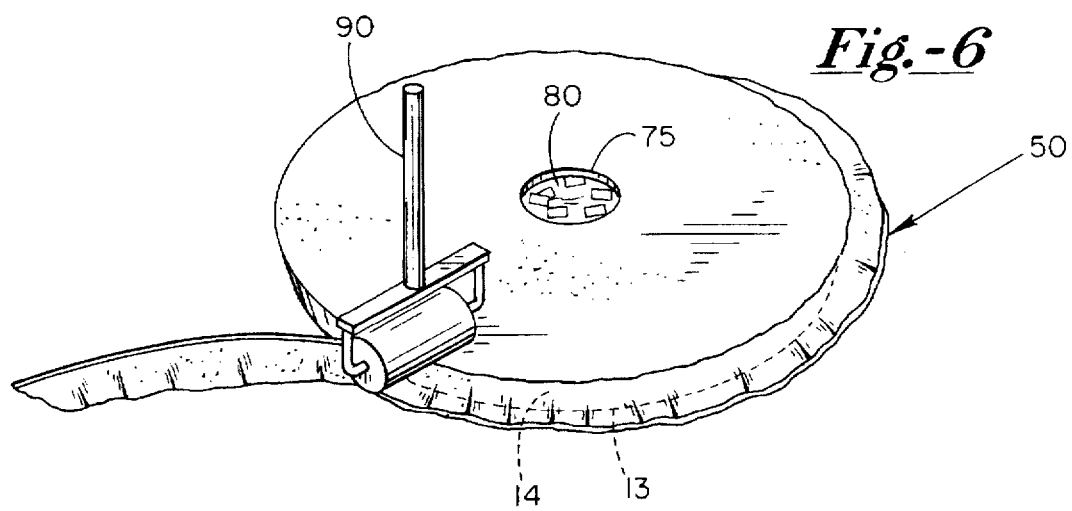
FIGS. 6 is a perspective view showing a partially assembled pizza product according to one embodiment of the invention.

As shown in FIGS. 4 and 6, a cookie-cutter, biscuit-cutter or similar handheld instrument 70, or a non-handheld instrument such as a dough press, is used to punch or cut at least one vent opening 75 in upper dough layer 50 after it has been placed, perforation side down, on peel 65 or similar utensil. Hole 75 is preferably circular, resulting from a circle of dough being physically removed from dough layer 50, although other shapes can be used, of course. According to a preferred embodiment, hole 75 has a diameter of approximately three inches, although different-sized holes can be used as well. This hole in the upper dough layer allows steam to escape from the underlying cheese layer, as will be described, preventing excess, undesirable bubbling/blistering of upper dough layer 50 and the ingredients that are placed on top of it. Such excessive bubbling/blistering is of course very undesirable, because it creates an unattractive, sloppy appearance, and can redistribute toppings completely off dough layer 50.

As has previously been described, products and methods according to the invention are well-suited to high-quantity production levels, for example in franchise restaurants. Accordingly, several top dough sheets 50 can be placed on peel 65 in an evenly stacked configuration, perforated side down. Instrument 70, a dough press, or whatever tool is being used then punches out opening 75 in the center of the stack of top dough sheets 50, punching through all of the sheets in the stack. According to one embodiment, up to seven top dough sheets 50 can be stacked and perforated substantially simultaneously in this manner. Punching more than seven dough sheets 50, however, can cause the dough sheets to stick together, making them difficult to separate. As few as five or as many as ten dough sheets can be successfully punched in operational environments, depending on temperatures and other environmental conditions present at the time of punching.

Figure 5:
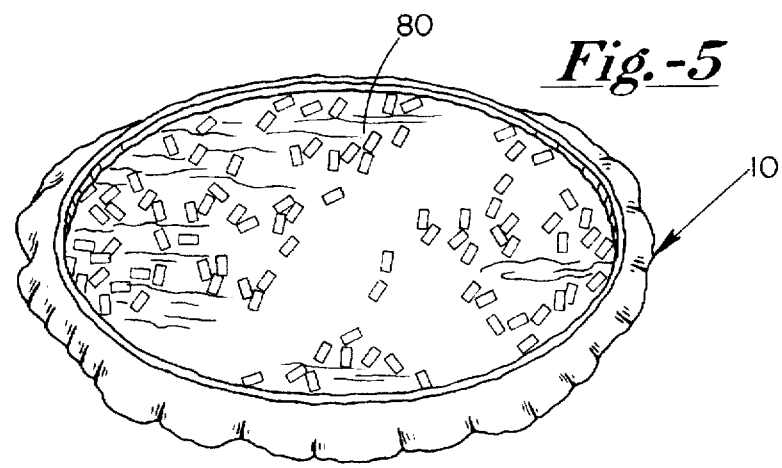
FIGS. 5 is a perspective view showing a first ingredient layer disposed on the bottom dough sheet of FIGS. 1.

As shown in FIGS. 5, the panned, perforated, unsauced and untrimmed bottom shells 10 are then filled with first ingredient layer 80 that is supported by and at least partially covers first dough layer 10. According to a one embodiment, first ingredient layer 80 comprises a cheese ingredient, or a blend of different cheeses. Other ingredients can also be included in layer 80, such as pepperoni or ham, either mixed with or instead of the cheese ingredient. References throughout this application to the "cheese" layer or ingredient, therefore, should be construed to mean cheese and/or other ingredients.

A preferred cheese used between dough layers 10, 50 is specifically designed to have a lower moisture content than many conventional cheeses. Using conventional cheeses, with higher moisture contents, can create excess steam that adds to the bubbling/blistering problem described above, and which can redistribute the cheese and toppings on the top dough layer or cause them to slide off completely. A preferred cheese moisture content level of about 47%±2% has been found especially desirable for the desirable pizza-making processes and resulting pizzas described herein. According to one embodiment, approximately 10.1 ounces of the blended cheese is placed on the lower dough layer of a 12 inch pizza. Of course, other cheese or cheese blends can be used in first ingredient layer 80.

Turning to FIGS. 6, after cheese blend or other ingredient 80 is placed on lower dough sheet 10, upper dough sheet 50 is placed over bottom sheet 10, preferably perforated side down. Vent aperture 75 preferably is centered over pan 13. Also as shown in FIGS. 6, dough trimmer 90 is used to trim excess dough from the shell, preferably with one pass around the circumference of rim 14. This seals top and bottom dough shells 50, 10 together. Excess scrap dough can be discarded immediately, or re-combined for use in other products. If desired, partially prepared pizzas at this point can be transferred to a retarder, pie case, or other suitable refrigeration for storage, and then baked at a later time. Alternatively, of course, assembly of the pizza product can be completed immediately, as will now be described.

Tomato sauce layer 100 (FIGS. 7) is applied over top dough shell 50, preferably covering vent opening 75. Top dough layer 50 preferably is sauced to within one-half inch of the edge of the crust. According to a preferred method, dough layer 50 is sauced by beginning at the outside of the crust and moving inwardly toward opening 75. Although opening 75 can be covered with sauce, it is generally preferred to stop short of opening 75 to prevent cheese or other ingredient in first ingredient layer 80 from sticking to the saucing implement. Only the number of pizza products expected to be sold within two hours should be sauced, and presauced pizza products that are not completed immediately should be refrigerated.

Finally, tomato sauce layer 100 is covered with layer 105 of pizza toppings ordered by the ultimate consumer. The ingredients placed in layer 105 on top of upper dough layer 50 can be selected from those typically used in conventional pizzas, such as cheese, tomato sauce, sausage, pepperoni, mushrooms, etc., according to the tastes of the consumer. These ingredients typically cover and thus conceal the ring-shaped hole punched in the top dough layer. FIGS. 7 shows a cross-section of an uncooked but completely assembled pizza product, including upper and lower dough layers 50, 10, cheese or other ingredient layer 80, aperture 75 disposed through top dough layer 50, and sauce and toppings ingredient layers 100, 105.

The completely formed pizza product can then be baked in a single, continuous step. No partial baking or pre-baking is required. According to a preferred embodiment, pizza pan 13 or other utensil supporting the pizza product is placed on a conveyor belt that carries the pan through a baking chamber. After the pan completely exits the baking chamber on the conveyor belt, the pan is removed using a suitable gripping device and placed on a cutting table or other suitable location. A spatula is run under the pizza, and the pizza is carefully lifted out of the pan and placed on a cutting board or other suitable cutting surface. The pizza is then cut into preferably eight slices. After a final quality check, during which it is ensured that the cheese covers the tomato sauce and that the toppings are evenly distributed, and that no bubbles of crust appear without cheese or toppings, the pizza product is served to the consumer.

FIGS. 8 shows a slice of a cooled pizza product according to an embodiment of the invention. Cheese layer 80 preferably overhangs bottom crust layer 10, as shown at 85, for example. Cooked top layer 110 preferably includes sauce layer 100 and toppings layer 105, mixed together to a certain extent during the baking process.

Thus, a stuffed-style pizza is produced in a relatively straightforward manner and with only a single baking step. Partially assembled products can be stored for later completion and baking. Efficient, mass-quantity production is achieved, suitable for use in high-volume chain restaurants, for example.

In preparing pizza dough for a pizza product according to the invention, a desired amount of dough preferably is mixed for approximately three minutes, and proofed for approximately 60–90 minutes at 95°±5° F. Dough balls of approximately 14 ounces are weighed out for a 13 inch pan, and are passed through a dough roller twice to achieve an appropriate thickness. Dough of a relatively low moisture content preferably is used, for appropriate crust texture and rigidity.

FIGS. 9 discloses a top dough layer according to an alternate embodiment of the invention, as described in concurrently filed, co-pending U.S. application Ser. No. 60/010,036 to Woodward et al., entitled "Dough Punch and Method", the disclosure of which application is incorporated herein by reference in its entirety.

In certain applications of the invention, food ingredient layer 80 generates excess steam during the baking process even with vent opening 70 present in top dough sheet 50. Such excess steam can be generated by using food ingredients with high moisture contents, for example, or by baking the pizza product at high elevations. To provide additional venting through the dough sheet, therefore, multiple openings 175 extend through top dough sheet 150 in the FIGS. 9 embodiment. Although sixty-five openings 175 are illustrated in a preferred pattern in FIGS. 9, of course different patterns and different numbers of openings also can be used. Openings 175 are advantageously produced by the dough press disclosed in the above-referenced co-pending application.

The invention is not considered to be limited to the products and methods specifically described herein. On the contrary, various modifications will be apparent to those of ordinary skill upon reading this disclosure. For example, although the disclosure describes only two crust layers and an interposed cheese layer, additional ingredient layers and/or additional crust layers can also be used. Other modifications will also be apparent to those of ordinary skill.

What is claimed is:

1. A method of preparing a baked pizza product, the method comprising the steps of:
   (a) placing a first dough layer onto a pizza-baking utensil;
   (b) placing a layer of cheese over the first dough layer;
   (c) placing a second dough layer over the cheese layer such that the cheese layer is interposed between the first and second dough layers;
   (d) forming a vent hole in the second dough layer by removing a substantial piece of dough from the second dough layer;
   (e) placing a layer of sauce and a layer of at least one additional ingredient onto the second dough layer to form a pizza product; and
   (f) baking the pizza product formed by steps a–e in a single continuous step.

2. The method of claim 1, further including, between steps (c) and (d), the step of trimming the first and second dough layers around the pizza-baking utensil to seal the first and second dough layers together.

3. The method of claim 1, wherein step (b) includes the step of placing over the first dough layer a layer of cheese having a moisture content in the range of about 45%–49%.

4. The method of claim 3, further comprising the step of perforating the first and second dough layers with multiple perforations that extend at least partially through the dough layers.

5. The method of claim 1, wherein the vent hole is defined in the second dough layer before step (c).

6. The method of claim 5, further comprising, before step (c), the step of forming the vent hole in the second dough layer by punching at least one hole through the second dough layer with a hole-punching device.

7. The method of claim 5, further comprising, before step (c), the step of forming the vent hole in the second dough layer by punching at least one hole through the second dough layer with a dough press.

8. The method of claim 5, further comprising, before step (c), the step of forming a vent hole in each of a plurality of dough sheets substantially simultaneously, the plurality of dough sheets each to be used on different pizza products as the second dough layer.

9. The method of claim 1, wherein the vent hole is centered on the second dough layer over the first dough layer.

10. The method of claim 1, further including the step of forming multiple vent holes through the second dough layer.

11. The method of claim 1, wherein the substantial piece of dough is removed from a central portion of the second dough layer.

12. The method of claim, 11 wherein the piece of dough removed is about three inches wide.

13. The method of claim 1, wherein the method includes removing dough from the second dough layer to define a plurality of separated vent holes through the second dough layer.

14. A method of preparing a baked pizza product, the method comprising the steps of:
   (a) placing a first dough layer onto a pizza-baking pan;
   (b) placing a food ingredient layer comprising cheese over the first dough layer to substantially cover the first dough layer on the pan;
   (c) placing a second dough layer over the food ingredient layer to cover the food ingredient layer such that the food ingredient layer is interposed between the first and second dough layers;
   (d) forming a substantially circular vent opening having a diameter of about 3 inches by removing dough from the second dough layer;
   (e) placing a layer of sauce and a layer of at least one additional pizza topping ingredient onto the second dough layer to form a pizza product; and
   (f) baking the pizza product formed by steps (a)–(e) in a single, continuous step.

15. The method of claim 14, wherein step (e) includes the step of venting steam originating in the food ingredient layer through the vent opening in the second dough layer.

16. The method of claim 14 further comprising the step of perforating the first and second dough layers with multiple perforations extending at least partially through the first and second dough layers.

17. The method of claim 14, wherein the cheese has a moisture content in the range of about 45%–49%.

18. The method of claim 14 wherein the method includes removing a substantially intact section of dough from the second dough layer to define the vent opening disposed therethrough.

19. The method of claim 17 further comprising the step of perforating the first and second dough layers with multiple perforations that extend at least partially through the dough layers.

20. The method of claim 1, wherein the vent hole formed in the second dough layer is a substantially circular vent hole.

* * * * *